Patented Feb. 25, 1930

1,748,240

UNITED STATES PATENT OFFICE

KURT H. MEYER, OF MANNHEIM, AND HEINRICH HOPFF AND ARTHUR KRAUSE, OF LUDWIGSHAFEN-ON-THE-RHINE, GERMANY, ASSIGNORS, BY MESNE ASSIGNMENTS, TO GENERAL ANILINE WORKS, INC., OF NEW YORK, N. Y., A CORPORATION OF DELAWARE

META SUBSTITUTED BENZOYLAMINO ANTHRAQUINONES AND PROCESS OF MAKING SAME

No Drawing. Application filed November 3, 1925, Serial No. 66,668, and in Germany February 16, 1925.

It is already known that anthraquinones containing one or more benzoyl-amino groups in alpha position possess the property of vat coloring matters.

We have now found that vat coloring matters possessing specially valuable properties are formed in the alpha-benzoyl-amino-anthraquinone series by those hitherto unknown alpha-benzoyl-amino-anthraquinones which contain in a benzoyl group, or in more than one benzoyl group, a substituent in meta position. Such substituents, however, which would detract from the fastness of the vat dyestuffs, as for example free hydroxy or amino groups, nitro- or cyano-groups, should not be present, but difficulty attackable substituents, for example alkyl groups etherified hydroxy groups, etherified mercapto groups and many others are suitable which are not altered in a reducing vat or on chlorination and which, for the sake of brevity, will be referred to as difficulty attackable groups in the following and in the claims.

The vat dyestuffs made in accordance with our present invention possesses a very good affinity to vegetable fibres, silk and similar materials and produce bright shades of excellent fastness to light.

The said dyestuffs can be prepared by boiling an alpha-amino-anthraquinone which may contain or be free from other substituents with the required quantity of a meta-substituted benzoyl-chlorid or benzoic anhydrid, or by heating a mixture of the amino-anthraquinone body and a meta-substituted benzoic acid in the presence of a suitable condensing agent such for example as thionyl chlorid, phosphorus pentachlorid, zinc chlorid and others.

The following examples will serve to further explain some modes of carrying our invention into practice but our invention is not restricted to these examples. The parts are by weight.

Example 1

238 parts of 1.4-diamino-anthraquinone, 340 parts of meta-methoxy benzoyl-chlorid and 2400 parts of nitrobenzene are boiled under a reflux cooler until no unaltered diamino-anthraquinone can be found any longer. The vat dyestuff is isolated in the usual manner. It corresponds to the formula

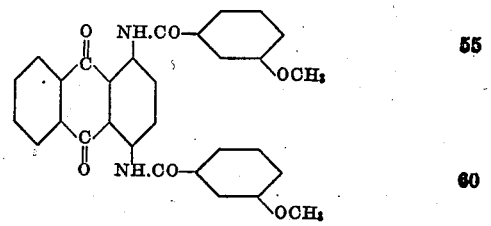

and dyes cotton from a dark violet vat beautiful red shades with a bluish tinge.

Other ethers of meta-oxy-benzoyl-chlorid, for example meta-ethoxy-benzoyl-chlorid can be employed in an analogous manner.

Example 2

238 parts of 1.5 diamino-anthraquinone are condensed with 340 parts of meta-methoxy-benzoyl-chlorid in the manner described in the foregoing example. The vat dyestuff so obtained produces on cotton from a cherry red vat a fine full yellow. It corresponds to the formula

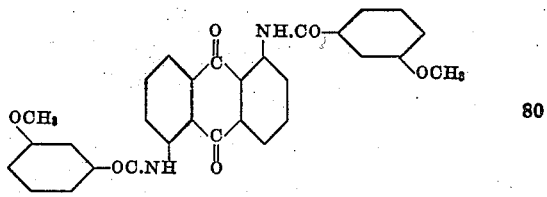

1.5 - diamino - 4 - hydroxy - anthraquinone when condensed with meta-methoxy- or ethoxy-benzoyl-chlorid in a similar manner gives a full red, 1.5-diamino-4-methoxy-anthraquinone and orange, diamino-anthrarufine a violet blue; and 1-methoxy-4-amino-anthraquinone a scarlet red. These coloring matters have the following formulæ, respectively

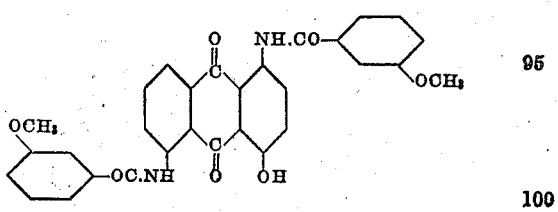

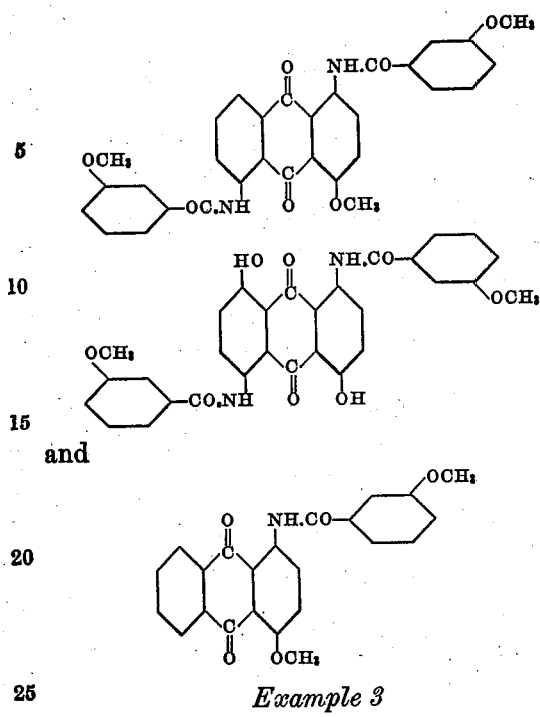

Example 3

238 parts of 1.4-diamino-anthraquinone, 2500 parts of nitro-benzene and 310 parts of meta-toluic acid chlorid are boiled under a reflux cooler until 1.4-diamino-anthraquinone is no longer present. The vat dyestuff obtained corresponding to the formula

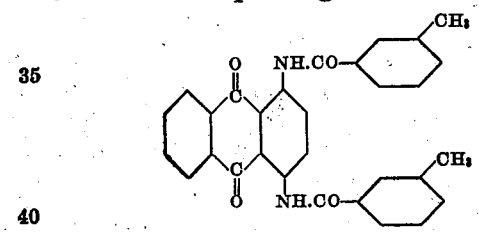

forms garnet red glittering leaflets and dyes cotton from a dark violet vat bluish red shades of excellent fastness.

Example 4

446 parts of 1-amino-anthraquinone and 170 parts of isophthalic acid are suspended in 5000 parts of trichlorbenzene. 300 parts of thionyl-chlorid are then added drop by drop at from 70 degrees to 80 degrees centigrade whereupon stirring is first continued for an hour at the same temperatures and the mixture then heated to boiling until unaltered 1-amino-anthraquinone can no longer be found. The dyestuff produced corresponding to the formula

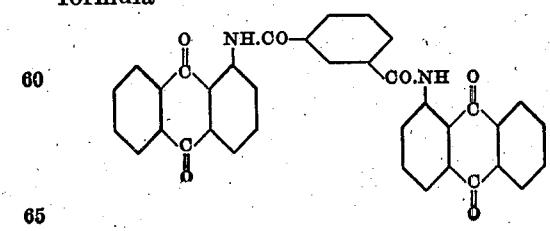

dyes cotton from a cherry red vat, bright lemon yellow shades of excellent fastness.

The following products can be obtained in an analogous manner:—

| Dyestuff from | Color of the vat | Shade on cotton |
|---|---|---|
| m-toluic acid (2 mol.) and 1.5-diamino-anthraquinone (1 mol.) | Violet | Yellow |
| m-benzoyl-amino-benzoic acid (2 mol.) and 1.5-diamino-anthraquinone (1 mol.) | Violet | Yellow |
| 1-thiophenol-methyl-ether-3-carboxylic acid (2 mol.) and 1.5-diamino-anthraquinone (1 mol.) | Brownish-violet | Yellow |
| Isophthalic acid (1 mol.) and 3-brom-1-amino-anthraquinone (2 mol.) | Cherry red | Lemon yellow |
| Isophthalic acid (1 mol.) and 1-benzoyl-amino-4-amino-anthraquinone (2 mol.) | Brown-violet | Red |
| Isophthalic acid (1 mol.) and 1-benzoyl-amino-5-amino-anthraquinone (2 mol.) | Violet | Yellow |
| 5-methoxy-1.3-isophthalic acid (1 mol.) and 1-amino-anthraquinone (2 mol.) | Cherry red | Lemon yellow |
| Diphenyl-m.m'-dicarboxylic acid (1 mol.) and 1-amino-anthraquinone (2 mol.) | Cherry red | Lemon yellow |
| Diphenyl-m.m'-dicarboxylic acid (1 mol.) and 1-benzoyl-amino-5-amino-anthraquinone (2 mol.) | Violet | Yellow |
| Diphenyl-m.m'-dicarboxylic acid (1 mol.) and 1-benzoyl-amino-4-amino-anthraquinone (2 mol.) | Brown-violet | Red |
| Diphenyl-m.m'-dicarboxylic acid (1 mol.) and 3-brom-1-amino-anthraquinone (2 mol.) | Cherry red | Lemon yellow |

We claim:

1. As new articles of manufacture, vat coloring matters of the anthraquinone series representing an anthraquinone body, containing at least one benzoyl-amino group in alpha position which group in the benzoyl radicle contains a difficultly attackable substituent in meta position but is unsubstituted in para-position.

2. As new articles of manufacture, vat coloring matters of the anthraquinone series representing anthraquinone with two meta-alkoxy-benzoyl-amino groups in alpha positions.

In testimony whereof we have hereunto set our hands.

KURT H. MEYER.
HEINRICH HOPFF.
ARTHUR KRAUSE.